(12) United States Patent
Hricišák et al.

(10) Patent No.: US 9,988,858 B1
(45) Date of Patent: Jun. 5, 2018

(54) END FITTING FOR SUCKER RODS

(71) Applicant: Endurance Lift Solutions, LLC, Gainesville, TX (US)

(72) Inventors: Karol Hricišák, Missouri City, TX (US); Ryan Scott Gernentz, Midland, TX (US)

(73) Assignee: Endurance Lift Solutions, LLC, Gainesville, TX (US)

( * ) Notice: Subject to any disclaimer, the term of this patent is extended or adjusted under 35 U.S.C. 154(b) by 0 days. days.

(21) Appl. No.: 15/855,793

(22) Filed: Dec. 27, 2017

(51) Int. Cl.
*E21B 17/04* (2006.01)
*E21B 17/043* (2006.01)
*E21B 17/046* (2006.01)
*F04B 47/02* (2006.01)

(52) U.S. Cl.
CPC .......... *E21B 17/046* (2013.01); *F04B 47/026* (2013.01)

(58) Field of Classification Search
CPC .... E21B 17/1071; E21B 17/04; E21B 17/043; E21B 17/046
See application file for complete search history.

(56) References Cited

U.S. PATENT DOCUMENTS

| | | |
|---|---|---|
| 2,251,031 A | 7/1940 | Bozeman, Jr. |
| 3,168,340 A | 2/1965 | Howard |
| 3,489,445 A | 1/1970 | Kammerer, Jr. |
| 3,534,989 A | 10/1970 | Yonkers |
| 4,064,953 A | 12/1977 | Collins |
| 4,297,787 A | 11/1981 | Fischer |
| 4,360,288 A | 11/1982 | Rutledge, Jr. |
| 4,401,396 A | 8/1983 | McKay |
| 4,422,508 A | 12/1983 | Rutledge, Jr. |
| 4,430,018 A | 2/1984 | Fischer |
| 4,435,615 A | 3/1984 | Kaczerginski |
| 4,576,058 A | 3/1986 | Matumoto |
| 4,585,368 A | 4/1986 | Pagan |

(Continued)

FOREIGN PATENT DOCUMENTS

| | | |
|---|---|---|
| EP | 2570588 A1 | 3/2013 |
| GB | 2058177 A | 4/1981 |

(Continued)

OTHER PUBLICATIONS

PCT/US2015/055025; EPO International Search Report and Written Opinion; dated Jan. 27, 2016; 10 pages.

(Continued)

*Primary Examiner* — Cathleen R Hutchins
(74) *Attorney, Agent, or Firm* — Hall Estill Law Firm

(57) ABSTRACT

The disclosure relates to an end fitting attachable to an end of a sucker rod. The end fitting includes a generally cylindrical body including a receptacle portion and a coupling portion along a longitudinal axis. The receptacle portion includes a receptacle extending inwardly from an open end surface of the body along the longitudinal axis for receiving the sucker rod end therein. The receptacle includes a plurality of wedge portions disposed therein and the coupling portion extends from a coupling end surface of the body opposite the open end surface. The wedge portions each have a peak portion, a first angled portion and a second angled portion. Each second angled portion has an angle with respect to the longitudinal axis wherein each angle of the second angled portions increases from the open end surface of the receptacle portion toward the coupling portion of the end fitting.

9 Claims, 4 Drawing Sheets

(56) References Cited

U.S. PATENT DOCUMENTS

| | | |
|---|---|---|
| 4,597,688 A | 7/1986 | Pagan |
| 4,653,983 A | 3/1987 | Anderson et al. |
| 4,787,771 A | 11/1988 | Allen |
| RE32,865 E | 2/1989 | Rutledge, Jr. |
| 4,919,560 A | 4/1990 | Rutledge, Jr. |
| 5,253,946 A | 10/1993 | Watkins |
| 5,464,058 A | 11/1995 | McCoy |
| 5,573,344 A | 11/1996 | Crane |
| 6,193,431 B1 | 2/2001 | Rutledge |
| 6,472,604 B2 | 10/2002 | Nakamura |
| 7,316,268 B2 | 1/2008 | Peleanu et al. |
| 8,113,277 B2 | 2/2012 | Rutledge et al. |
| 2004/0202521 A1 | 10/2004 | Bostik |
| 2008/0245570 A1 | 10/2008 | Partouche |
| 2011/0150596 A1 | 6/2011 | Wolodko et al. |
| 2014/0079470 A1 | 3/2014 | Watkins et al. |
| 2014/0102715 A1 | 4/2014 | Rutledge et al. |
| 2016/0102694 A1 | 4/2016 | Gernentz et al. |

FOREIGN PATENT DOCUMENTS

| | | |
|---|---|---|
| GB | 2505065 A | 2/2014 |
| WO | 2008033738 A2 | 3/2008 |
| WO | 2013022478 A1 | 2/2013 |
| WO | 2016057976 A1 | 4/2016 |

OTHER PUBLICATIONS

PCT/US2015/055026; International Search Report and Written Opinion; dated Jun. 24, 2016; 17 pages.

US 9,988,858 B1

END FITTING FOR SUCKER RODS

CROSS-REFERENCE TO RELATED APPLICATION

Not applicable.

FIELD OF THE DISCLOSURE

The disclosure relates generally to continuous composite or fiberglass rod assemblies for well pump drives and, in particular, to end fittings attachable to such rods.

BACKGROUND OF THE DISCLOSURE

During production of a well, for example an oil well, the pressure from the well reservoir often becomes insufficient to transport hydrocarbons to the surface without the assistance of a pump. In such cases, a down-hole pump is typically lowered into the well, and attached to the lower end of a sucker rod string. The upper end of the rod string is then attached to a pump jack or similar reciprocating surface apparatus. Through reciprocation of the pump jack, the rod string is used to drive the down-hole pump, enabling continued production of the well.

Sucker rods are connected together in a string by connectors or end fittings attached to the ends of each rod. The end fittings comprise a rod receptacle at one end to receive the rod end, and a threaded coupling at the other end to threadingly connect to the end fitting of the next successive rod. The space between the interior wall of the rod receptacle and the external surface of the rod defines a space or annulus which is filled with epoxy or some other initially flowable adhesive similar to epoxy. The epoxy cures into a solid which bonds to the rod and takes the form of a series of wedges that cooperatively engage complementary surfaces in the rod receptacle to prevent rod pullouts (wherein the rod is pulled out of the connector rod receptacle) that would otherwise result in failure of the string.

Production of the well leads to fluids flowing in an annulus area. The annulus area is defined by the area between the sucker rod string and the well in the radial direction. The diameter of the end fittings can be a flow deterrent for fluid flowing through the annulus area. Accordingly, there is a need for an end fitting that can handle the forces and conditions encountered in the well and also allow for better fluid flow in the annulus outside of the sucker rod string.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY OF THE DISCLOSURE

The present disclosure is directed to a sucker rod and end fitting assembly. The sucker rod including a sucker rod end and an end fitting secured to the sucker rod end. The end fitting includes a generally cylindrical body including a receptacle portion and a coupling portion along a longitudinal axis. The receptacle portion has a receptacle extending inwardly from an open end surface of the body along the longitudinal axis for receiving the end of the sucker rod therein. Additionally, the receptacle has a plurality of successive wedge portions disposed therein. The coupling portion extends from a coupling end surface of the body opposite the open end surface and is configured to connect the end fitting to another component. The wedge portions each have a peak portion, a first angled portion and a second angled portion. The second angled portions each have an angle with respect to the longitudinal axis wherein each angle of the second angled portions increases in the direction from the open end surface of the receptacle portion toward the coupling portion of the end fitting.

The present disclosure is further directed to an end fitting attachable to an end of a sucker rod. The end fitting having a generally cylindrical body including a receptacle portion and a coupling portion along a longitudinal axis. The receptacle portion having a receptacle extending inwardly from an open end surface of the body along the longitudinal axis for receiving the sucker rod end therein. The receptacle having a plurality of wedge portions disposed therein and the coupling portion extending from a coupling end surface of the body opposite the open end surface, and configured to connect the end fitting to another component. The wedge portions each have a peak portion, a first angled portion and a second angled portion. The second angled portions each have an angle with respect to the longitudinal axis wherein each angle of the second angled portions increases in the direction from the open end surface of the receptacle portion toward the coupling portion of the end fitting.

The present disclosure is also directed toward an end fitting attachable to an end of a sucker rod. The end fitting having a generally cylindrical body including a receptacle portion and a coupling portion along a longitudinal axis. The receptacle portion having a receptacle extending inwardly from an open end surface of the body along the longitudinal axis for receiving the sucker rod end therein and the receptacle having an outer diameter and a plurality of wedge portions disposed therein. The coupling portion extends from a coupling end surface of the body opposite the open end surface and is configured to connect the body to another component. The end fitting is designed such that the outer diameter of the end fitting being within 55% of the diameter of the sucker rod.

DETAILED DESCRIPTION OF THE DISCLOSURE

Figure 1:
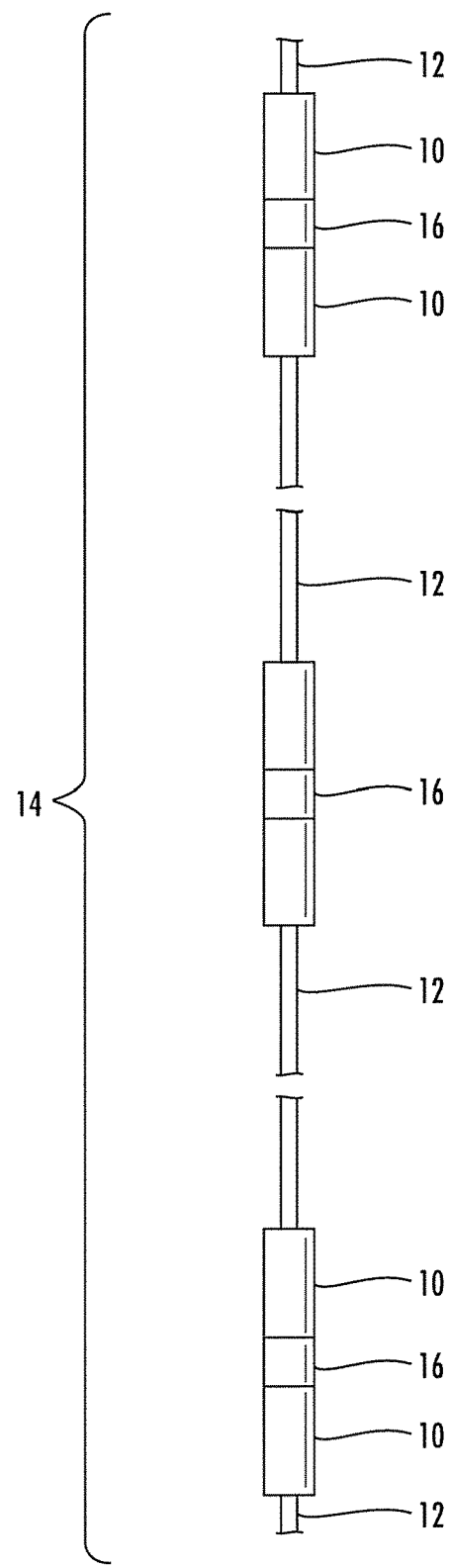
FIG. 1 is a schematic view of a portion of a sucker rod string incorporating a sucker rod end fitting in accordance with the present disclosure.

Referring now to FIG. 1, shown therein is a plurality of sucker rod end fittings 10 and rods 12 cooperating to form a rod string 14. Each end fitting 10 may be secured to each end of the fiberglass rods 12. To form the rod string 14, adjacent end fittings 10 of adjacent fiberglass rods 12 are secured to a coupling 16. The coupling 16 may be formed as an annular tube with threads along an interior surface of the tube.

Figures 2, 3:
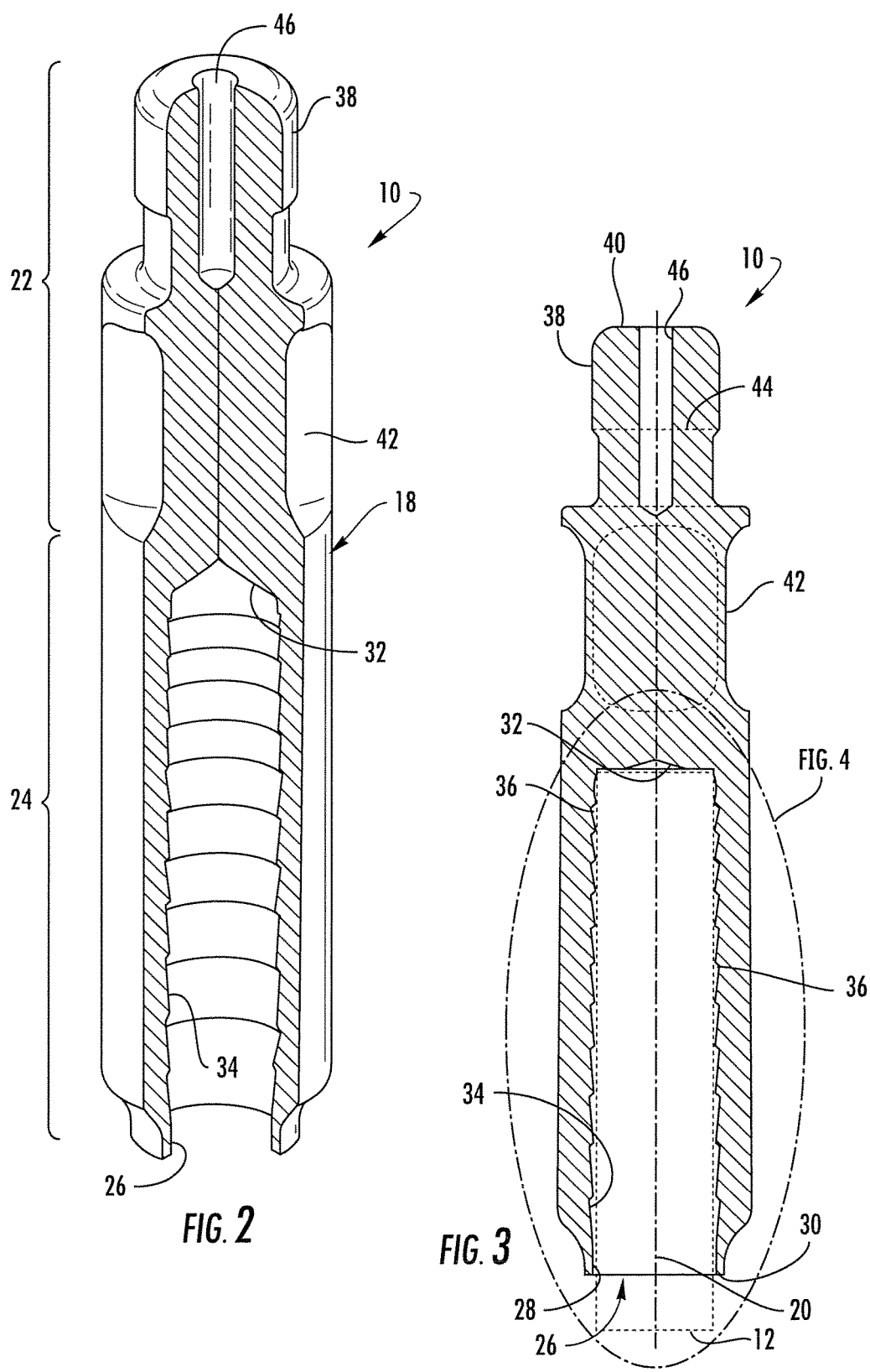
FIG. 2 is a revolved cross-sectional view of the sucker rod end fitting constructed in accordance with the present disclosure.
FIG. 3 is a cross-sectional view of the end fitting in accordance with the present disclosure.

FIGS. 2 and 3 show one of the end fittings 10 in more detail. The end fitting comprises a substantially cylindrical body 18 extending along a longitudinal axis 20. The body 18 defines a generally solid coupling portion 22 and a generally annular receptacle portion 24. The receptacle portion 22 includes a rod receptacle or cavity 26 with an end opening 28 commencing at open end surface 30. Cavity 26 terminates at pilot bore surface 32. Connective interior surface 34 is a surface of revolution that defines a plurality of spaced conical shapes.

As is known in the art, when an end of a fiberglass rod 12 is inserted into the rod receptacle 26, an exterior surface of the fiberglass rod and the interior surface 34 of receptacle 26 to form annular, wedge-shaped voids 36 around the fiberglass rod 12 sometime referred to as annuli. When a suitable adhesive, such as heat-cured epoxy or other adhesive known in the art, is introduced into the receptacle 26 along with the end of the fiberglass rod 12, the adhesive fills the annular wedged-shaped voids 36 such that, the adhesive is cured and bonded to the fiberglass rod 12. The resulting solid portions of wedge-shaped adhesive cooperate with the complementary surfaces of the voids 36 to secure the end fitting 10 to the fiberglass rod 12.

The coupling portion 22 of end fitting 10 includes a pin portion 38 commencing at a coupling or solid end surface 40 that that permits connection of the end fitting 10 to other end fittings. For example, the pin portion 38 may include external threads (not shown) along its exterior surface configured to mate with complementary threads (not shown) of a coupling 16 seen in FIG. 1. As further shown, the coupling portion 22 of end fitting 10 may comprise additional structures such as wrench flats 42 located adjacent the pin portion 38.

The end fitting 10 includes an area of predictive failure, generally designated 44, incorporated into the coupling portion 22 of sucker rod end fitting 10. As illustrated, the area of predictive failure 44 of this embodiment includes a blind bore or hole 46 aligned with a longitudinal axis 20 of the end fitting 10 extending through the body of the of the coupling portion 22 from solid end surface 40. The bore 46 terminates within the body of the pin portion 38 generally near the beginning of the wrench flats 42 does not extend through the entire length of the coupling portion 22. Rather it terminates prior to reaching the pilot bore surface 32 located in receptacle or cavity 26.

Figure 4:
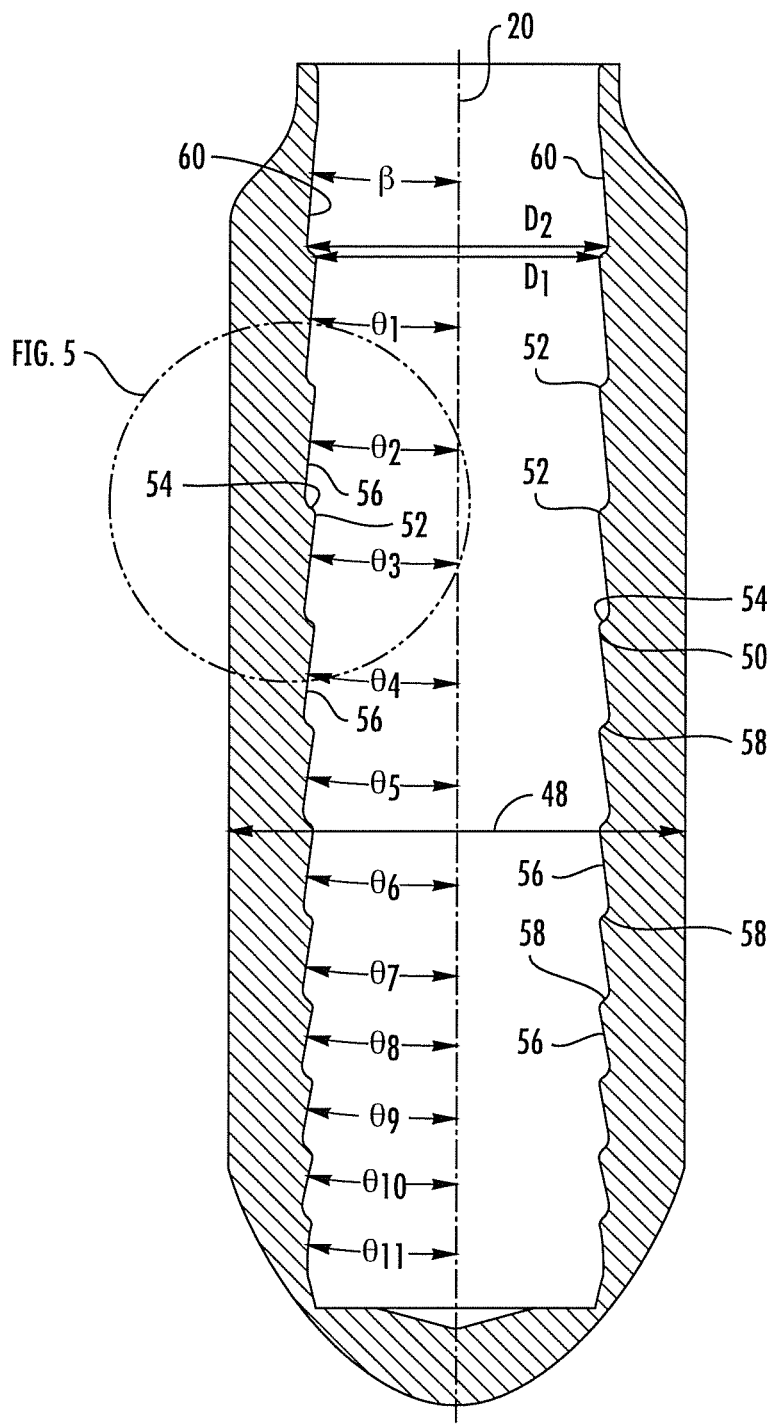
FIG. 4 is a cross-sectional view of a portion of the end fitting shown in FIG. 3 in accordance with the present disclosure.
Figure 5:
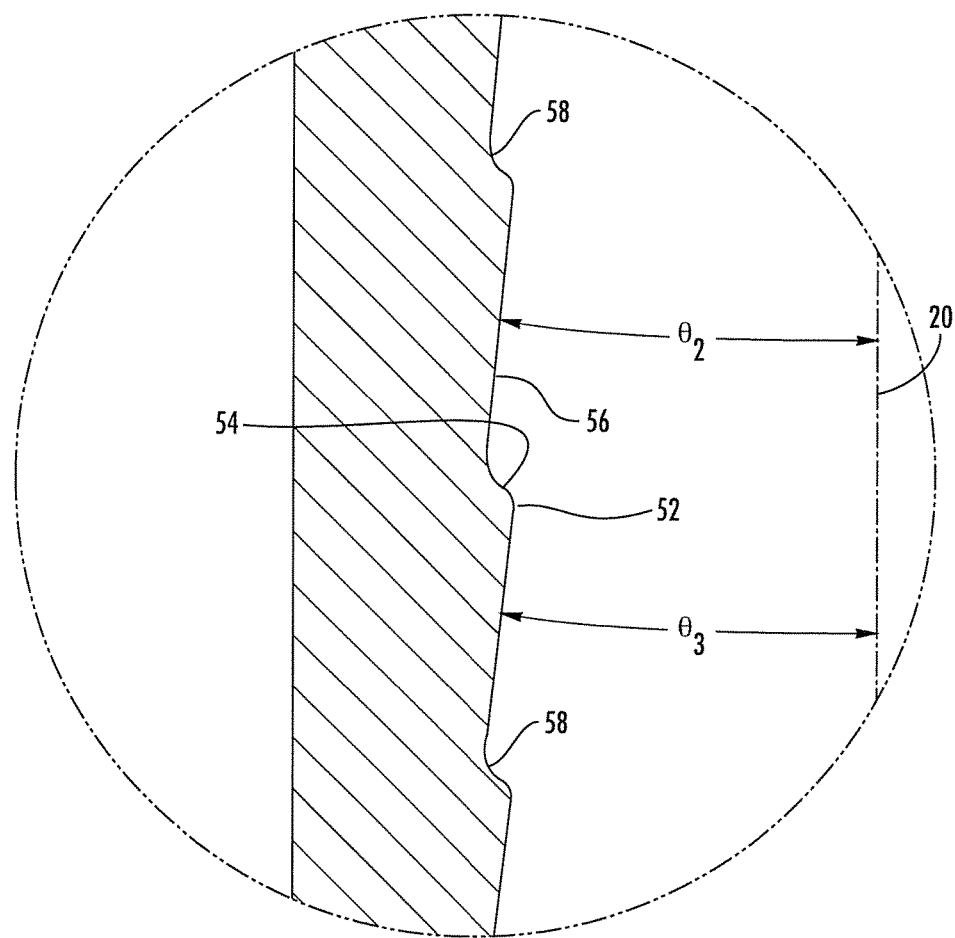
FIG. 5 is a cross-sectional view of a portion of the end fitting shown in FIG. 4 in accordance with the present disclosure.

In a further embodiment of the present disclosure shown in more detail in FIGS. 4 and 5, the annular receptacle portion 24 of the end fitting 10 has an outer diameter 48 and an inner diameter that varies due to a unique geometry of the interior surface 34 of the end fitting 10. The unique geometry of the interior surface 34 permits the outer diameter 48 of the annular receptacle portion 24 to be lower than previously believed in the art. Previously, the outer diameter of end fittings had to be a certain length so that the end fittings could withstand the operating conditions and forces exerted on the end fittings by engagement with the rod 12. The unique geometry of the interior surface 34 provides surprising results in that the end fitting 10 can have a considerably narrower profile (narrower outer diameter of the annular receptacle portion 24). The narrower profile permits better fluid flow in the well around the end fittings 10, and thus the rod string 14.

The unique geometry on the interior surface 34 of the annular receptacle portion 24 is comprised of a series of wedge portions 50 that extend inwardly to engage the rod 12. The annular, wedge-shaped voids 36 described herein are disposed between the wedge portions 50. Each wedge portion 50 includes a peak portion 52, a first angled portion 54 disposed on the open end surface 30 side of the peak portion 52 and a second angled portion 56 disposed on the pilot bore surface 32 side of the peak portion 52. The wedge portions 50 are separated by transition areas 58 that exist at the interior surface 34 between the second angled portion 56 of a wedge portion 50 and the first angled portion 54 of an adjacent wedge portion 50. An inner diameter $D_1$ exists between each peak portion 52 of each wedge portion 50 in the annular receptacle portion 24. Similarly, a second inner diameter $D_2$ exists between each transition area 58 disposed between each pair of adjacent wedge portions 50. The peak portions 52 of the wedge portions 50 can all have the same radius $R_1$ and the transition areas 58 can all have the same radius $R_2$.

The first angled portion 54 of each wedge portion 50 in the series of wedge portions 50 is essentially the same for each wedge portion 50. The second angled portions 56 of each wedge portion 50 is unique. As shown in FIG. 4, each second angled portion 56 has a unique angle $\theta_N$ with respect to the longitudinal axis 20. In one embodiment, the angle $\theta_N$ of the second angled portions 56 increases for each wedge portion 50 as the wedge portions 50 are positioned from the open end surface 30 to the pilot bore surface 32 of the annular receptacle portion 24. In other words, the angle $\theta_N$ for second angled portion 56 of the wedge portion 50 closest to the open end surface 30 of the annular receptacle portion 24 is lower than the angle $\theta_N$ of the second angled portion 56 of the wedge portion 50 closest to the pilot bore surface 32 of the annular receptacle portion 24. The length of the second angled portions 56 decreases as the angle $\theta_N$ increases.

In an exemplary embodiment, FIG. 4 shows the end fitting 10 with numerous wedge portions 50 and numerous angles $\theta_N$ corresponding to the second angled portions 56. In this embodiment, there are 11 wedge portions 50 shown and 11 angles $\theta_N$ and 1 angle $\beta$ shown. The angles $\theta_N$ are depicted by $\theta_1$-$\theta_{11}$. The angles $\theta_1$-$\theta_{11}$ are associated with the second angled portion 56 of a corresponding wedge portion 50. The angle $\beta$ is the angle of the connective interior surface 34 between the wedge portion 50 closest to the open end surface 30 and the open end surface 30. This portion of the connective interior surface 34 is referred to as an angled inner surface 60.

In this embodiment, the second angled portion 56 of each wedge portion 50 increases from one wedge portion 50 to the next adjacent wedge portion 50. In other words, the difference in the angle $\theta_1$ and the angle $\theta_2$ is smaller than the difference between the angle $\theta_2$ and the angle $\theta_3$. Furthermore, the difference in the angle $\theta_2$ and the angle $\theta_3$ is smaller than the difference between the angle $\theta_3$ and the angle $\theta_4$. This would prove to be true all the way through the wedge portions 50 whereby the difference in the angle $\theta_8$ and the angle $\theta_9$ is smaller than the difference between the angle $\theta_9$ and the angle $\theta_{10}$. The previous structure applies to the angle $\beta$ as well. The difference between angle $\beta$ and the angle $\theta_1$ is smaller than the difference in the angle $\theta_1$ and the angle $\theta_2$.

The angle of the second angled portions 56 and the angled inner surface 60 can be determined by an equation where x is the position of the angled surface (the second angled portions 56 and the angled inner surface 60) relative to the open end surface 30 and y is the angle of the angled surface relative to the longitudinal axis 20. Alternatively, you can determine the angle of the second angled portion 56 or the angled inner surface 60 by making x the number of the wedge portion 50 that comes immediately after the angled surface for with the angel is being determined. For example, if the angle β is being determined, x would be 1 because the first wedge portion 50a from the open end surface 30 is positioned as the first wedge portion 50a after the angled inner surface 60. Furthermore, if the angle $\theta_1$ is being determined, x would be 2 because the second wedge portion 50b from the open end surface 30 is positioned as the next wedge portion 50 after the second angled portion 56 of the first wedge portion 50a. The equation is as follows:

$$y = -0.0037x^3 + 0.1085x^2 - 0.1025x + 5.0636$$

For the exemplary embodiment of the present disclosure, the following is a table showing the surface angle results:

| Surface Angle | X | Y | Nominal Angle | Change in Angle |
|---|---|---|---|---|
| β | 1 | 5.07 | 5.0° | N/A |
| $\Theta_1$ | 2 | 5.26 | 5.3° | 0.3 |
| $\Theta_2$ | 3 | 5.63 | 5.7° | 0.4 |
| $\Theta_3$ | 4 | 6.15 | 6.2° | 0.5 |
| $\Theta_4$ | 5 | 6.80 | 6.8° | 0.6 |
| $\Theta_5$ | 6 | 7.56 | 7.5° | 0.7 |
| $\Theta_6$ | 7 | 8.39 | 8.3° | 0.8 |
| $\Theta_7$ | 8 | 9.29 | 9.2° | 0.9 |
| $\Theta_8$ | 9 | 10.23 | 10.2° | 1.0 |
| $\Theta_9$ | 10 | 11.19 | 11.3° | 1.1 |
| $\Theta_{10}$ | 11 | 12.14 | 12.2° | 0.9 |
| $\Theta_{11}$ | 12 | 13.094 | 12.9 | 0.7 |

As shown in the table above, the change in surface angle increases by a tenth of a degree and increases at this rate for about 80% to about 85% of the engagement length of the annular receptacle portion 24. After the 80% to about 85% of the engagement length of the annular receptacle portion 24, the change in the surface angles decreases. The increase in surface angle and length of the second angled portions 56 of the wedge portions 50 allows the volume of the wedge portions 50 to be fully utilized which creates a more uniform stress distribution. The uniform stress distribution minimizes the amount of axial deformation (slip of the rod 12) within the end fitting 10.

The unique geometry described herein for the connective interior surface 34 of the annular receptacle portion 24 permits a decreased outer diameter of the annular receptacle portion 24 without sacrificing the operational performance of the end fitting 10. Typically, the outer diameter of an end fitting for use with 1.25" API rod is about 2". Using the unique geometry herein, the outer diameter can be decreased to about 1.81". This results in a reduction in the outer diameter of more than 0.18" or 9%.

Similarly, the typical outer diameter of an end fitting for use with 1" API rod is about 1.625". Using the unique geometry herein, the outer diameter can be decreased to about 1.5". This results in a reduction in the outer diameter of more than 0.125" or 8%.

Another way to capture this reduction in outer diameter of the end fitting 10 is to capture it in light of the size of the rod 12 the end fitting 10 is being used with. In one embodiment, the outer diameter of the end fitting 10 can be within about 55% of the diameter of the rod 12 or 55% larger than the diameter of the rod 12. In another embodiment of the present disclosure, the outer diameter of the end fitting 10 can be within about 50% of the diameter of the rod 12 or 50% larger than the diameter of the rod 12. In yet another embodiment of the present disclosure, the outer diameter of the end fitting 10 can be within 45% of the diameter of the rod 12 or 45% larger than the diameter of the rod 12.

Typical sized tubing that rod strings 14 are deployed have internal diameters of 2" (outer diameter of 2⅜") and 2.5" (outer diameter of 2⅞"). Normal end fittings for 1.25" rods cannot typically be deployed in 2⅜" tubing due to the outer diameter being essentially equal to the internal diameter of the 2⅜" tubing. With the end fittings 10 described herein, the end fittings for 1.25" rods cannot typically be deployed in 2⅜" tubing due to the outer diameter being too close in size to the 2⅜" tubing. The ability to reduce the outer diameter of the end fitting 10 as described herein permits the use of end fittings for 1.25" rods with 2⅜" tubing.

Furthermore, end fittings 10 described herein for 1.25" rods can now be deployed in 2⅞" tubing and create an increased annulus area and reduce the flow restriction of fluids in the annulus area. Similarly, the end fitting 10 described herein for use with 1" API rod can be deployed with 2⅜" tubing or 2⅞" tubing and create an increased annulus area and reduce the flow restriction of fluids in the annulus area.

While particular preferred embodiments have been shown and described, those skilled in the art will appreciate that changes and modifications may be made without departing from the teachings disclosed herein. It is therefore contemplated that any and all modifications, variations or equivalents of the above-described teachings fall within the scope of the basic underlying principles disclosed above.

In a further embodiment of the present disclosure, a method of using the end fitting 10 described herein is provided. The end fitting 10 can be used in a method of withdrawing or producing fluids from an oil and gas well. The end fitting 10 can be used in a method of constructing the rod string 14 to be used in oil and gas wells.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A sucker rod and end fitting assembly comprising: a sucker rod including a sucker rod end; and
   an end fitting secured to the sucker rod end, wherein the end fitting comprises: a generally cylindrical body including a receptacle portion and a coupling portion along a longitudinal axis;
   the receptacle portion having a receptacle extending inwardly from an open end surface of the body along the longitudinal axis for receiving the end of the sucker rod therein, the receptacle having a plurality of successive wedge portions disposed therein and an engagement length where the sucker rod is engaged;
   the coupling portion extending from a coupling end surface of the body opposite the open end surface, and configured to connect the end fitting to another component;
   the wedge portions each have a peak portion, a first angled portion and a second angled portion; and the second angled portions each have an angle with respect to the longitudinal axis wherein each angle of the second angled portions increases in the direction from the open end surface of the receptacle portion toward the coupling portion of the end fitting, the second angled portions of each wedge creates a series of successive second angled portions, the difference in angle of each pair of successive second angled portions is 0.1 degrees greater than the difference in angle of each adjacent pair of successive second angled portions for about 80% to about 85% of the engagement length.

2. The assembly of claim 1, wherein the receptacle portion of the end fitting has an outer diameter being within 55% of the diameter of the sucker rod.

3. The assembly of claim 1, wherein the receptacle portion of the end fitting has an outer diameter being within 50% of the diameter of the sucker rod.

4. The assembly of claim 1, wherein the receptacle portion of the end fitting has an outer diameter being within 46% of the diameter of the sucker rod.

5. The assembly of claim 1, wherein the difference in angle between each pair of successive second angled portions and the difference in angle of each adjacent pair of successive second angled portions decreases after about 80% to about 85% of the engagement length.

6. An end fitting attachable to an end of a sucker rod, comprising:
   a generally cylindrical body including a receptacle portion and a coupling portion along a longitudinal axis;
   the receptacle portion having a receptacle extending inwardly from an open end surface of the body along the longitudinal axis for receiving the sucker rod end therein, the receptacle having a plurality of wedge portions disposed therein and an engagement length where the sucker rod is engaged;
   the coupling portion extending from a coupling end surface of the body opposite the open end surface, and configured to connect the end fitting to another component;
   the wedge portions each have a peak portion, a first angled portion and a second angled portion; and
   the second angled portions each have an angle with respect to the longitudinal axis wherein each angle of the second angled portions increases in the direction from the open end surface of the receptacle portion toward the coupling portion of the end fitting, the second angled portions of each wedge creates a series of successive second angled portions, the difference in angle of each pair of successive second angled portions is 0.1 degrees greater than the difference in angle of each adjacent pair of successive second angled portions for about 80% to about 85% of the engagement length.

7. The end fitting of claim 6, wherein the difference in angle between each pair of successive second angled portions and the difference in angle of each adjacent pair of successive second angled portions decreases after about 80% to about 85% of the engagement length.

8. The end fitting of claim 6 wherein each peak portion has a substantially equal inner diameter.

9. The end fitting of claim 6 wherein transition areas exist between the second angled portion of the wedge portion and the first angled portion of an adjacent wedge portion, each transition area has a substantially equal inner diameter.

\* \* \* \* \*